(12) United States Patent
Chan et al.

(10) Patent No.: US 7,178,816 B2
(45) Date of Patent: Feb. 20, 2007

(54) VEHICLE SUSPENSION BEAM

(75) Inventors: David Chan, Flintshire (GB); Martin Peaker, Chester (GB)

(73) Assignee: Meritor Heavy Vehicle Systems Limited, Wrexham (GB)

( * ) Notice: Subject to any disclaimer, the term of this patent is extended or adjusted under 35 U.S.C. 154(b) by 0 days.

(21) Appl. No.: 11/333,657

(22) Filed: Jan. 17, 2006

(65) Prior Publication Data

US 2006/0113742 A1 Jun. 1, 2006

Related U.S. Application Data

(63) Continuation of application No. 10/415,609, filed as application No. PCT/GB01/03895 on Aug. 31, 2001, now Pat. No. 7,048,288.

(30) Foreign Application Priority Data

Sep. 5, 2000 (GB) ................................ 0021718.2

(51) Int. Cl.
*B60G 9/02* (2006.01)
(52) U.S. Cl. .................. 280/124.116; 280/124.128
(58) Field of Classification Search ......... 280/124.116, 280/124.128, 124.11, 124.13, 124.132, 124.153; 301/125

See application file for complete search history.

(56) References Cited

U.S. PATENT DOCUMENTS

| 1,325,832 A | 12/1919 | Coburn |
| 2,011,239 A | 8/1935 | Christman |
| 2,163,981 A | 6/1939 | Lawrence |

(Continued)

FOREIGN PATENT DOCUMENTS

DE 1933469 7/1969

(Continued)

OTHER PUBLICATIONS

Daytonair Truckmaster Suspension Brochure (Prior Art); date unknown.

(Continued)

*Primary Examiner*—David R. Dunn
(74) *Attorney, Agent, or Firm*—Carlson, Gaskey & Olds

(57) ABSTRACT

A hollow vehicle suspension beam (1) has opposed side walls formed with recesses (11) in which an axle wrap (2) is located and secured by welded jointing (12, 13) internally and externally of the opposed side walls to provide a strong joint between the beam and axle wrap. The beam may comprise at least one component (5, 6) of a generally U-shaped section the opposed limbs of which provide at least part of the opposed side walls of the beam, and the mouth of the section provides an access opening into the interior of the beam for the internal welded jointing (12) to be made at the axle wrap. One embodiment has the beam comprised of two of the U-shaped components (5, 6) disposed with their mouths opening in opposite directions to provide access to the interior of the beam for the internal welded jointing to be made at the axle wrap (2) before the mouths are closed by closure components (15, 16). Another embodiment has the opposed side walls formed in combination by the opposed limbs of a U-shaped component and the space between the plate components being closed off by closure components after the internal welded joint have been made.

20 Claims, 1 Drawing Sheet

U.S. PATENT DOCUMENTS

| | | | |
|---|---|---|---|
| 2,606,036 | A | 8/1952 | Collender |
| 2,635,896 | A | 4/1953 | Tantlinger |
| 2,877,010 | A | 3/1959 | Gouirand |
| 2,913,252 | A | 11/1959 | Norrie |
| 2,993,707 | A | 7/1961 | Vaugoyeau |
| 3,140,880 | A | 7/1964 | Masser |
| 3,434,707 | A | 3/1969 | Raidel |
| 3,547,215 | A | 12/1970 | Bird |
| 3,594,017 | A | 7/1971 | Grosseau |
| 3,630,541 | A | 12/1971 | Carlson |
| 3,707,298 | A | 12/1972 | Henry |
| 3,771,812 | A | 11/1973 | Pierce |
| 3,785,673 | A | 1/1974 | Harbers |
| 3,961,826 | A | 6/1976 | Sweet |
| 4,027,898 | A | 6/1977 | Steen |
| 4,061,362 | A | 12/1977 | Bufler |
| 4,065,153 | A | 12/1977 | Pringle |
| 4,166,640 | A | 9/1979 | VanDenberg |
| 4,174,855 | A | 11/1979 | Vandenberg |
| 4,293,145 | A | 10/1981 | Taylor |
| 4,310,171 | A | 1/1982 | Merkle |
| 4,352,509 | A | 10/1982 | Paton |
| 4,371,190 | A | 2/1983 | Vandenberg |
| 4,415,179 | A | 11/1983 | Marinelli |
| 4,427,213 | A | 1/1984 | Raidel |
| 4,494,771 | A | 1/1985 | Raidel |
| 4,504,080 | A | 3/1985 | Vandenberg |
| 4,529,224 | A | 7/1985 | Raidel |
| 4,537,420 | A | 8/1985 | Ito |
| 4,541,643 | A | 9/1985 | Pavincic |
| 4,566,719 | A | 1/1986 | Vandenberg |
| 4,691,937 | A | 9/1987 | Raidel |
| 4,693,486 | A | 9/1987 | Pierce |
| 4,722,549 | A | 2/1988 | Raidel |
| 4,763,923 | A | 8/1988 | Raidel |
| 4,878,691 | A | 11/1989 | Cooper |
| 4,902,035 | A | 2/1990 | Raidel |
| 4,943,081 | A | 7/1990 | Golpe |
| 4,991,868 | A | 2/1991 | Vandenberg |
| 5,002,305 | A | 3/1991 | Raidel |
| 5,029,885 | A | 7/1991 | Steiner |
| 5,037,126 | A | 8/1991 | Gottschalk |
| 5,058,916 | A | 10/1991 | Hicks |
| 5,112,078 | A | 5/1992 | Galazin |
| 5,127,668 | A | 7/1992 | Raidel |
| 5,171,036 | A | 12/1992 | Ross |
| 5,203,585 | A | 4/1993 | Pierce |
| 5,366,237 | A | 11/1994 | Dilling |
| 5,375,871 | A | 12/1994 | Mitchell et al. |
| 5,403,031 | A | 4/1995 | Gottschalk |
| 5,443,280 | A | 8/1995 | Kawaguchi |
| 5,464,245 | A | 11/1995 | Vogler |
| 5,639,110 | A | 6/1997 | Pierce et al. |
| 5,690,353 | A | 11/1997 | Vandenberg |
| 5,720,489 | A | 2/1998 | Pierce |
| 5,785,345 | A | 7/1998 | Barlas |
| 5,810,377 | A | 9/1998 | Keeler |
| 5,887,881 | A | 3/1999 | Hatch |
| 5,921,570 | A | 7/1999 | Lie |
| 5,938,221 | A | 8/1999 | Wilson |
| 5,944,339 | A | 8/1999 | McKenzie |
| 5,950,971 | A | 9/1999 | Koumbis |
| 5,954,351 | A | 9/1999 | Koschinat |
| 5,988,672 | A | 11/1999 | VanDenberg |
| 5,996,981 | A | 12/1999 | Dilling |
| 6,039,336 | A | 3/2000 | Frey |
| 6,062,578 | A | 5/2000 | Richardson |
| 6,073,946 | A | 6/2000 | Richardson |
| 6,123,349 | A | 9/2000 | Depue |
| 6,209,895 | B1 | 4/2001 | Mueller et al. |
| 6,241,266 | B1 * | 6/2001 | Smith et al. .......... 280/124.116 |
| 6,264,231 | B1 | 7/2001 | Scully |
| 6,425,593 | B2 | 7/2002 | Fabris |
| 6,508,482 | B2 | 1/2003 | Pierce |
| 2003/0146592 | A1 | 8/2003 | Chalin et al. |
| 2004/0051268 | A1 | 3/2004 | Chan et al. |

FOREIGN PATENT DOCUMENTS

| | | |
|---|---|---|
| DE | 3119022 A1 | 12/1982 |
| EP | 0458665 A1 | 11/1991 |
| EP | 0600198 B1 | 6/1994 |
| WO | WO 98/17487 | 4/1998 |
| WO | WO 00/01548 | 1/2000 |

OTHER PUBLICATIONS

Eaton Axle and Brake Brochure and Information—1989.

Fruehauf Cargo Care and Pro Par Suspension Brochure (Prior Art)—date unknown.

GMC Astro-Air Suspension Brochure and Information (Prior Art)—date unknown.

HT Series Suspension Brochure (Prior Art)—date unknown.

Hutchens & Sons Suspensions Brochure (Prior Art)—date unknown.

Rockwell International ROR Bogie Assemblies Brochure—date unknown.

* cited by examiner

VEHICLE SUSPENSION BEAM

REFERENCE TO RELATED APPLICATIONS

This application is a Continuation patent application of U.S. patent application Ser. No. 10/415,609 filed Apr. 30, 2003, which claims priority to PCT patent application No. PCT/GB01/03895 which was filed on Aug. 31, 2001, which claims priority to Great Britain Patent Application No. GB 0021718.2 which was filed on Sep. 5, 2000.

BACKGROUND OF THE INVENTION

This invention relates generally to a vehicle suspension beam that is pivotal at one end to a support for use, carries a spring means at or towards its opposite end, and has an axle connected to the beam at an intermediate part of its length.

Suspension beams are known which are of a box-section fabricated from metal plate. An axle wrap that retains an axle is secured transversely of its length in complementary recesses formed in the beam. The axle wrap is secured to the exterior of the beam by welding or adhesive jointing. A problem experienced with this known suspension beam is that the welded jointing is weakened by metal fatigue and can fail when the axle and the beam are subjected to loading in use.

SUMMARY OF THE INVENTION

The present invention is aimed at providing a vehicle suspension beam having a stronger joint between a beam and an axle wrap.

According to the present invention, a hollow vehicle suspension beam has opposed side walls formed with recesses. An axle wrap is located and secured to the recesses of the beam by welded jointing internally and externally of said side walls.

At least adjacent to the recesses, the beam includes an access opening or openings for access into the interior of the beam. The access opening allows the welded jointing to be made between the axle wrap and the opposed side walls. The access opening is located between the side walls, and can be closed. The beam includes at least one component of a generally U-shaped section having opposed limbs that provide at least part of the side walls. A mouth provides the access opening to the interior of the beam. A closure component secured to the U-shaped component closed the mouth after the welded jointing has been made internally of the side walls. Alternately, a U-shaped component extends substantially to one side of the axle wrap to provide part of the side walls of the beam and laterally spaced plate components extend substantially to an opposite side of the axle wrap to provide further parts of the side walls of the beam. Access to the interior of the beam for the welded jointing internally of the side walls is made by the mouth of the U-shaped component and by the space between the plate components. The mouth and the space can be closed off subsequently by closure components that are fixed, for example by welding, to the U-shaped component and the plate components. In another construction, the beam has components of a generally U-shaped section adjacent to the recesses. Mouths of the components provide access openings which open in opposite directions transversely of the beam and provide access to the interior of the beam for the welded jointing of the axle wrap to the side walls at the interior of the beam to be made. In whichever manner an access opening or openings is provided, it is preferably possible for a continuous welded joint to be made around the circumference of the axle wrap contained inside the beam.

In one example, the beam includes two elongate components of a generally U-shaped section connected end-to-end such that the mouth of the U-shaped section of one component is oppositely directed to that of the other component. The opposed limbs of the U-shaped sections of the components form the side walls of the beam. The recesses for the axle wrap are formed in at least one of the components or adjacent to the end-to-end connection. Access is provided through the mouths of the components for the internal welded jointing of the axle wrap to the side walls of the interior of the beam to be made. The mouths are subsequently closed by closure plates. In another example, the beam includes one elongate component of a generally U-shaped section and two laterally spaced side plate components which are connected end-to-end with, as continuations of, the opposed limbs of the U-shaped component. The opposed limbs of the U-shaped component and the side plate components form side walls of the beam. The recesses for the axle wrap are formed in the U-shaped component and/or in the side plate components at or adjacent to the connection of the side plate components to the limbs of the U-shaped component. Cover plates are secured over the mouth of the U-shaped component and between the side plate components after the welded jointing at the interior of the beam has been made to close off the interior of the beam. The finished beam has a closed box-section. A cover plate which closes the mouth of the U-shaped component can also extend over and be secured to the adjacent longitudinal edges of the side plate components.

The axle wrap is secured to the beam such that part of its length is fully contained inside the beam. Alternatively, for part of its length, a portion of the circumference of the axle wrap is contained inside the beam and the remainder of the circumference of that part of the length of the axle wrap is exposed outside the beam. The recesses in the beam are formed accordingly.

In the examples described, the recesses are partially formed in the ends of the components at which the components are connected together.

A shear plate or plates are secured across the interior of the beam to increase the transverse rigidity of the beam's section, if required.

The suspension beam of the present invention has a substantially stronger connection between the beam and axle wrap as a result of the internal and external welded jointing at the side walls of the beam than has been possible with the known suspension beams which only have external welding jointing at the beam to the axle wrap. The internal and external welded jointing eliminates the failure-promoting relative bending which has occurred at the root of the conventional, external only, welded joint between the beam and axle wrap under loading on the suspension beam when in use. Loading is concentrated instead on the parent material of the structure of the beam.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENT

The suspension beam of the present invention is provided for a trailing arm suspension of a trailer vehicle.

Figure 1:
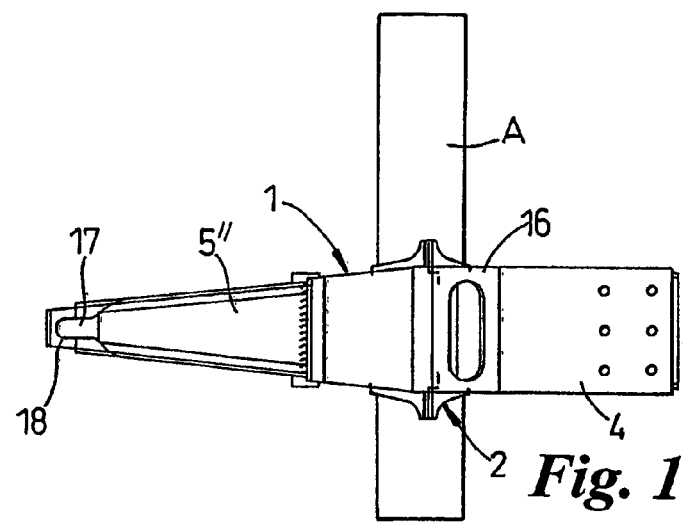
FIG. 1 is a plan view of a suspension beam in accordance with the present invention.
Figure 2:
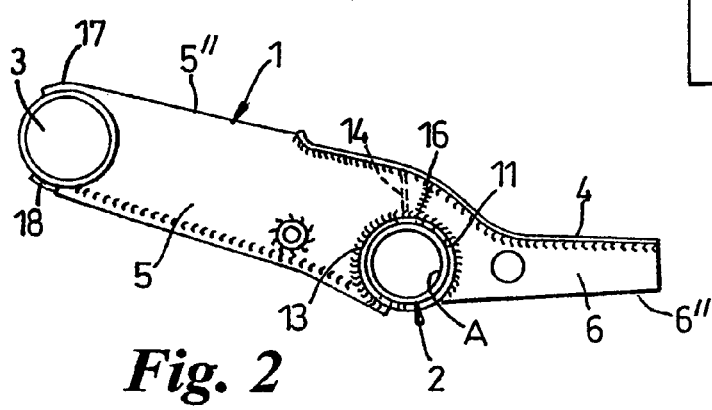
FIG. 2 is a side view of the suspension beam.

As shown in FIG. 1, the suspension beam includes a beam proper 1 and an axle wrap 2 secured transversely to the beam 1 at an intermediate part of the length of the beam 1. In use, as shown in FIG. 2, a pivot brush 3 is secured to a front end of the beam 1, an air spring (not shown) is mounted on a seating 4 provided on the rearward end part of the beam 1, and the axle wrap 2 is secured on an axle A.

Figure 3:
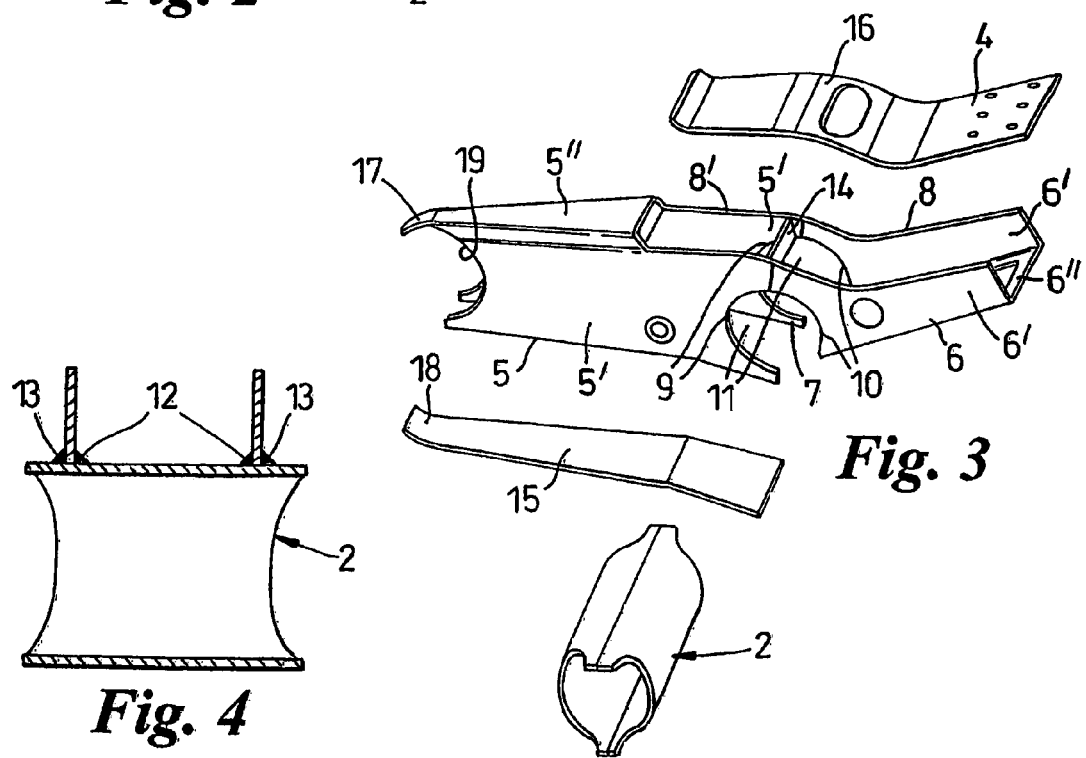
FIG. 3 is an exploded perspective view of the suspension beam.

As best seen in FIG. 3, the beam 1 comprises two elongate forward and rearward components 5, 6, respectively, which are each of a generally U-shaped section and are butt-welded end-to-end. Each component 5, 6 is made from metal plate cut to the required outline and formed to the generally U-shaped section. Each of the components 5, 6 include opposed side limbs 5', 6', respectively, and a web 5", 6", respectively, that are straight and meet at right angles to form three sides of a box-section. The side limbs 5' of the forward component 5 converge towards the front end of the beam 1, whereas the side limbs 6' of the rearward component 6 run substantially in parallel to the rear end of the beam 1. At their butting ends, the two components 5,6 are welded together at their side limbs 5', 6' to form side walls of the beam 1. The components 5, 6 are welded such that the web 5" of the forward component 5 is at the top of the beam 1, and the web 6" of the rearward component 6 is at the bottom of the beam 1. Mouths 7, 8 of the U-shaped sections of the forward and rearward components 5, 6 are thus respectively at the bottom and the top of the beam 1 and provide access into the interior of the beam 1 at the two components 5, 6. Part of the web 5" of the forward component 5 is cut away adjacent to the rearward component 6 to provide an extension 8' of the mouth 8 of the rearward component 6 into the forward component 5.

Alternately, a U-shaped component extends substantially to one side of the axle wrap to provide part of the side walls of the beam and laterally spaced plate components extend substantially to an opposite side of the axle wrap to provide further part of the side walls of the beam. Access to the interior of the beam for the welded jointing internally of the side walls is made by the mouth of the U-shaped component and by the space between the plate components. The mouth and the space can be closed off subsequently by closure components that are fixed, for example by welding, to the U-shaped component and the plate components. In another construction, the beam has components of a generally U-shaped section adjacent to the recesses. Mouths of the components provide access opening which open in opposite directions transversely of the beam and provide access to the interior of the beam for the welded jointing of the axle wrap to the side walls at the interior of the beam to be made. In whichever manner an access opening or openings is provided, it is preferably possible for a continuous welded joint to be made around the circumference of the axle wrap contained inside the beam.

The side limbs 5' of the forward component 5 taper gradually towards the front of the beam 1. The side limbs 6' of the rearward component 6 are of a similar height to those of the forward component 15 at the butting ends of the components 15, 16, but then taper to approximately half of that height and continue at this reduced height, with a gradual taper, for the greater part of the length of the component 16 extending to the rear of the beam 1.

Part-circular hollows 9, 10 are formed in the edges of the side limbs 5', 6', respectively, at the butting ends of the two components 5, 6. With the components 5, 6 welded together, the hollows 9, 10 in their aligned side limbs 5', 6' define together an almost circular recess 11 at each side of the beam 1. The two recesses 11 are co-axial and of a complementary diameter to receive the axle wrap 2 as a close fit. The hollows 9 in end edges of the side limbs 5' of the forward component 5 are adjacent to the mouth 7 of the section of that component 5, and the hollows 10 in the end edges of the side limbs 6' of the rearward component 6 are adjacent to the web 6" of the section of the rearward component 6. The two recesses 11 are open for a short arcuate distance, of less than one quarter of their circumferences, through the bottom of the beam 1.

Figure 4:
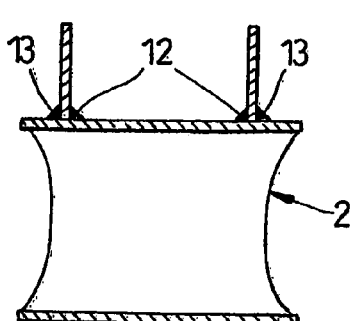
FIG. 4 is an enlarged detailed section through the suspension beam.

The axle wrap 2 is tubular and formed from two similar semi-cylindrical metal shells welded together. The axle wrap 2 is located in the co-axial recesses 11 and projects from each side of the beam 1, as shown in FIG. 1. The axle wrap 2 is secured to the beam 1 at the side limbs 5', 6' of the forward and rearward components 5, 6 by continuous welding 12, 13 around the edges of the hollows 9, 10 on the inside (shown in FIG. 4) and the outside surfaces (shown in FIGS. 2 and 4) of the side limbs 5', 6'. Access for the welding at the inside surfaces is gained through the mouths 7, 8 of the U-shaped sections of the two components 5, 6. The mouths 7, 8 allow sufficient access for continuous welding to be done all around the perimeter of each recess 11 at the inside surfaces of the respective side limbs 5', 6'.

The axle wrap 2 can also be welded to the adjacent edge of the web 6" of the rearward component 6.

A stiffening shear plate 14 is secured across the interior of the forward component 5 of the beam 1 above and generally radial to the axle wrap 2.

The shear plate 14 extends between and is welded to the side limbs 5' of the forward component 5.

Once the axle wrap 2 and the shear plate 14 have been welded in place, a forward cover plate 15 is welded in the mouth 7 of the forward component 5 to close the bottom of the beam 1 between its front end and the axle wrap 2. The cover plate 15 can also be welded to the axle wrap 2 as well. A rearward cover plate 16 is welded over the mouth 8 of the rearward component 6 and the extension 8' in the forward component 5 to close the top of the beam 1 between its rear end and the web 5" of the forward component 5. The rearward cover plate 16 provides the seating 4 on the beam 1 for the air spring.

Front ends 17, 18 of the web 5" of the forward component 5 and of the forward cover plate 15, respectively, and front edges of the side limbs 5' of the component 5 are so shaped as to form in combination a seating 19 to hold the pivot brush 3.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A vehicle suspension beam comprising:
   a beam having a hollow interior and opposed side walls each including recess, wherein said beam includes at least one access opening for access into said hollow interior to locate at least one internal weld bead inside said opposed side walls between an axle wrap and said opposed side walls and a closure component that closes said at least one access opening; and
   said axle wrap located in said recesses and secured to said beam by said at least one internal weld bead inside said opposed side walls and by at least one external weld bead outside said opposed side walls.

2. The vehicle suspension beam according to claim 1 wherein said at least one access opening is located between said opposed side walls.

3. The vehicle suspension beam according to claim 1 wherein said at least one internal weld bead is continuous around a perimeter of said axle wrap.

4. The vehicle suspension beam according to claim 1 wherein part of a length of said axle wrap is fully enclosed within said beam.

5. The vehicle suspension beam according to claim 1 wherein a portion of a perimeter of said axle wrap is enclosed within said beam and a remainder of said perimeter is exposed outside said beam.

6. The vehicle suspension beam according to claim 1 wherein at least one shear plate is secured across said hollow interior to increase transverse rigidity of said beam.

7. The vehicle suspension beam as recited in claim 1 wherein said beam is formed of two components and one of said two components includes a tapered end.

8. The vehicle suspension beam as recited in claim 1 wherein said axle wrap includes two semi-circular shells welded together.

9. A vehicle suspension beam comprising:
   a beam having a hollow interior and opposed side walls each including a recess, wherein said beam includes at least one access opening for access into said hollow interior to locate at least one internal weld bead inside said opposed side walls between an axle wrap and said opposed side walls and a closure component that closes said at least one access opening after said at least one internal weld bead has been made inside said opposed side walls; and
   said axle wrap located in said recesses and secured to said beam by said at least one internal weld bead inside said opposed side walls and by at least one external weld bead outside said opposed side walls.

10. A vehicle suspension beam comprising:
    a beam having a hollow interior and opposed side walls each including a recess, wherein said beam includes at least one access opening for access into said hollow interior to locate at least one internal weld bead inside said opposed side walls between an axle wrap and said opposed side walls, said at least one access opening is located between said opposed side walls, said beam is formed of two components and each of said two components has a generally U-shaped cross-section and opposed limbs that act as at least part of said opposed side walls, and said beam includes a mouth that acts as said at least one access opening; and
    said axle wrap located in said recesses and secured to said beam by said at least one internal weld bead inside said opposed side walls and by at least one external weld bead outside said opposed side walls.

11. The vehicle suspension beam according to claim 10 wherein a closure component is secured to said opposed side walls to close said mouth after said at least one internal weld bead has been made inside said opposed side walls.

12. The vehicle suspension beam according to claim 10 wherein each of said two components extends substantially to one side of said axle wrap to provide part of said opposed side walls.

13. The vehicle suspension beam according to claim 12 wherein said mouth is closed by a closure component fixed to said opposed side walls.

14. A vehicle suspension beam comprising:
    a beam having a hollow interior and opposed side walls each including a recess, wherein said beam includes at least one access opening for access into said hollow interior to locate at least one internal weld bead inside said opposed side walls between an axle wrap and said opposed side walls, said at least one access opening comprises two access openings, and a closure component closes each of said two access openings; and
    said axle wrap located in said recesses and secured to said beam by said at least one internal weld bead inside said opposed side walls and by at least one external weld bead outside said opposed side walls.

15. The vehicle suspension beam as recited in claim 14 wherein one of said two access openings is an upper access opening and the other of said two access openings is a lower access opening.

16. A vehicle suspension beam comprising:
    a beam having a hollow interior and opposed side walls each including a recess, wherein said beam includes at least one access opening for access into said hollow interior to locate at least one internal weld bead inside said opposed side walls between an axle wrap and said opposed side walls, said beam is formed of two components, and one of said two components includes a web transverse to said opposed side walls that is attached to said axle wrap by a web weld bead; and
    said axle wrap located in said recesses and secured to said beam by said at least one internal weld bead inside said opposed side walls and by at least one external weld bead outside said opposed side walls.

17. A vehicle suspension beam comprising:
    a beam having a hollow interior and opposed side walls each including a recess, wherein said beam includes at least one access opening for access into said hollow interior to locate at least one internal weld bead inside said opposed side walls between an axle wrap and said opposed side walls, and said beam is formed of a front substantially U-shaped component and a rear substantially U-shaped component that are attached to define said recesses; and
    said axle wrap located in said recesses and secured to said beam by said at least one internal weld bead inside said opposed side walls and by at least one external weld bead outside said opposed side walls.

18. The vehicle suspension beam as recited in claim 17 wherein said front substantially U-shaped component and said rear substantially U-shaped component are attached by welding.

19. A vehicle suspension beam comprising:
    a beam having a hollow interior and opposed side walls each including a recess, wherein said beam is formed of two components secured together to define said recesses; and an axle wrap located in said recesses and secured to said beam by at least one internal weld bead inside said opposed side walls and by at least one external weld bead outside said opposed side walls.

20. A vehicle suspension beam comprising:

a beam having a hollow interior and opposed side walls each including a recess, wherein said beam includes at least one access opening for access into said hollow interior to locate at least one internal weld bead inside said opposed side walls between an axle wrap and said opposed side walls and a closure component that extends at least between said opposed side walls; and said axle wrap located in said recesses and secured to said beam by said at least one internal weld bead inside said opposed side walls and by at least one external weld bead outside said opposed side walls.

* * * * *

UNITED STATES PATENT AND TRADEMARK OFFICE
CERTIFICATE OF CORRECTION

PATENT NO. : 7,178,816 B2 Page 1 of 1
APPLICATION NO. : 11/333657
DATED : February 20, 2007
INVENTOR(S) : Chan et al.

It is certified that error appears in the above-identified patent and that said Letters Patent is hereby corrected as shown below:

Claim 1, Column 5, line 7: Insert "a" after --including--

Signed and Sealed this

First Day of May, 2007

JON W. DUDAS
*Director of the United States Patent and Trademark Office*